(12) United States Patent
Ishida et al.

(10) Patent No.: US 6,728,194 B1
(45) Date of Patent: Apr. 27, 2004

(54) OPTICAL RECORDING MEDIUM, METHOD OF MAKING THE SAME AND OPTICAL MEMORY DEVICE USING THE OPTICAL MEMORY MEDIUM

(75) Inventors: Futoshi Ishida, Takatsuki (JP); Seishi Ojima, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/448,466

(22) Filed: Nov. 24, 1999

(30) Foreign Application Priority Data

Nov. 25, 1998 (JP) ............................. 10-334728

(51) Int. Cl.[7] ................................. G11B 7/00
(52) U.S. Cl. ..................... 369/275.3; 369/288
(58) Field of Search ................ 369/44.11, 44.26, 369/124.01, 275.1, 275.3, 288; 430/321

(56) References Cited

U.S. PATENT DOCUMENTS 5,619,480 A 4/1997 Seo et al.

FOREIGN PATENT DOCUMENTS

| JP | 5-143977 | 6/1993 |
| JP | 6-187632 | 7/1994 |
| JP | 7-296361 | 11/1995 |
| JP | 7-296362 | 11/1995 |
| JP | 09-265661 | 10/1997 |
| JP | 09-306025 | 11/1997 |
| JP | 10-92028 | 10/1998 |

Primary Examiner—Paul W. Huber
(74) Attorney, Agent, or Firm—Morrison & Foerster LLP (57) ABSTRACT

An optical recording medium including a substrate, an information recording region arranged on the substrate and capable of bearing information being readable with predetermined light, and a tracking region arranged on the substrate, having optical characteristics different from those of the information recording region and having substantially no difference in level with respect to the surface of the information recording region. A method of making an optical recording medium, including the steps of forming uniformly a recording layer on a substrate, the recording layer being made of a recording material being reversibly reactive to predetermined light, and causing an irreversible reaction in a partial region of the recording layer without causing a substantial difference in level with respect to the other region of the recording layer. An optical memory device including the foregoing optical recording medium, an exposing device having a head for emitting evanescent light to the optical recording medium, a drive device for driving the head, and a control device for controlling the drive device to perform tracking of the head in accordance with the tracking region.

2 Claims, 6 Drawing Sheets

TRACKING SIGNAL PORTION

Fig.11(B)

TRACKING SIGNAL PORTION

OPTICAL RECORDING MEDIUM, METHOD OF MAKING THE SAME AND OPTICAL MEMORY DEVICE USING THE OPTICAL MEMORY MEDIUM

The invention is based on patent application No. 10-334728 Pat. filed in Japan, the contents of which are hereby incorporated by reference.

BACKGROUND OF THE INVENTION

1. Field of the Invention

The present invention relates to an optical recording medium which is used for recording and/or reproducing information using predetermined light, and also relates to a method of making the optical recording medium and an optical memory device using the optical recording medium.

2. Description of the Background Art

An optical recording medium is used for recording and/or reproducing information, and is adapted to allow the information recording and/or reproducing by emitting predetermined light thereto. These recording and reproducing with the predetermined light are performed by an optical memory device.

In such an optical memory device, a head for information recording emits a predetermined light spot to an information recording region on the optical recording medium so that information may be recorded (i.e., written) on the optical recording medium. Depending on the kind of the optical recording medium, the recording can be performed reversibly and, in other words, erasably (i.e., to allow rewriting of the information on the optical recording medium), or the recording can be performed irreversibly and, in other words, unerasably (without rewriting of the information on the optical recording medium). For reproducing (reading) information from the optical recording medium, a head for information reproduction emits a light spot to the information recording region of the optical recording medium.

In either of the above cases, the optical recording medium is moved relatively to the head provided for recording and/or reproducing the information, and the head emits the light spot onto the optical recording medium for recording or reproducing the information. In the case of, e.g., the optical recording medium having a disk form, the head is arranged in the predetermined position on the optical recording medium, and the head emits the light spot to the predetermined position (track) on the recording medium surface for recording or reproducing the information while keeping rotation of the recording medium. In this emitting operation, the light spot must be maintained at the predetermined position (track) on the recording medium surface.

For maintaining the light spot at the predetermined position (track) on the recording medium surface during the light emission, the recording medium surface is provided with a tracking pattern (i.e., tracking guide such as a guide groove) forming an index of the light spot position. This tracking guide is provided for the purpose of stably recording or reproducing information even if an eccentric motion or deviation from a perfect circle occurs in position on the recording medium, where the information is to be recorded or reproduced, due to rotation of the optical recording medium having, e.g., a disk form.

In an optical memory device which uses the optical recording medium provided with the tracking guide, the tracking pattern (tracking guide) is always tracked (followed) so that the light spot may always be located on the track of the recording medium where the information is to be recorded or reproduced. For accurate tracking, the tracking servo is performed, e.g., in the case where the optical recording medium has the disk form. In this tracking servo, a shift of the tracking guide, e.g., in the radial direction of the disk, which may occur due to rotation of the disk, is detected, and the position of the light spot is automatically controlled in accordance with the shift so that the light spot may always be emitted to the track on the optical recording medium.

The tracking servo can be classified into continuous servo system using a continuous tracking guide (e.g., groove) and a sample servo system using spaced tracking guides (e.g., pits). The continuous servo system can be classified into the push-pull type and the three-beam type.

In the continuous servo system of the push-pull type, the optical recording medium is provided with a tracking guide (guide groove) having a V-shaped section, and the light spot is emitted to the guide groove on the recording medium. The amount of light reflected from the guide groove is detected to determine a distribution of the light intensity by a multidevided photo detector, and the tracking is performed so that the measured light intensity distribution may be constant.

In the continuous servo system of the three-beam type, the optical recording medium is provided with a tracking guide formed of, e.g., signal pits. Three light spots, which are aligned in a direction inclined with respect to the track direction, are emitted to the signal pits on the recording medium. Amounts of light reflected from the respective signal pits are detected, and the tracking is controlled so that the amounts of the light reflected from the signal pits on the opposite ends may be equal to each other.

In the sample servo system, the optical recording medium includes a tracking guide provided with pattern groups which are spaced from each other by a predetermined distance. Each pattern group is formed of two signal pits, which are shifted from each other, e.g., in the tracking direction and are shifted slightly laterally with respect to the center of the track. The light spot is emitted to the pattern group on the recording medium, and the intensities of the light reflected from the pattern group (two signal pits) are detected. The tracking is controlled so that the reflectances determined by these two signal pits may lower by the same magnitude.

All of these types utilize the tracking guide (tracking pattern) having a surface at a level shifted from that of an information recording region. More specifically, the continuous servo system of the push-pull type utilizes the tracking pattern formed of a groove having a V-shaped section, and the continuous servo system of the three-beam type and the sample servo system utilize the tracking pattern of signal pits.

In addition to the above, such a tracking pattern may be utilized that requires neither groove nor pit on the optical recording medium. For example, Japanese Laid-Open Patent Publication No. 7-296361 has taught tracking servo for a magnetic recording medium, in which an optical pattern (i.e., a tracking layer) containing a dye for tracking servo signals is arranged under a magnetic layer for magnetic recording, and the tracking servo is performed using the optical pattern.

SUMMARY OF THE INVENTION

An object of the invention is to provide an optical recording medium, which is used for recording and/or reproducing information by predetermined light, and allows accurate tracking of a tracking pattern during recording and/or reproducing of the information, compared with a conventional optical recording medium having a tracking pattern which is formed of, e.g., a groove or pits and may cause a larger making error. It is also an object of the invention to provide a method of making such an optical recording medium.

Another object of the invention is to provide an optical recording medium, which is used for recording and/or reproducing information by predetermined light, and can keep a predetermined distance between the optical recording medium and the head or probe provided for information recording and/or reproducing while performing accurate tracking of the tracking pattern even in the case where the predetermined light must be emitted from the position near the optical recording medium for recording and/or reproducing of the information and, for example, in the case of near-field light recording and reproducing of information utilizing near-field light (evanescent light). It is also an object of the invention to provide a method of making such an optical recording medium.

Still another object of the invention is to provide an optical memory device which utilizes near-field light (evanescent light) for performing near-field light recording of information onto the optical recording medium and/or near-field light reproducing of information from the optical recording medium, or an optical memory device which utilizes the near-field light (evanescent light) only for performing near-field light reproduction. More specifically, the object of the invention is to provide the optical memory device which can perform recording and/or reproducing of information while performing accurate tracking of the tracking pattern of the optical recording medium accommodated in the device and performing control to keep a required space between the optical recording medium and the head or probe provided for information recording and/or reproducing.

The invention provides an optical recording medium, a method of making the same and an optical memory device described below.

Optical Recording Medium

An optical recording medium including:

a substrate;

an information recording region arranged on the substrate and capable of bearing information being readable with predetermined light; and a tracking region arranged on the substrate, having optical characteristics different from those of the information recording region and having substantially no difference in level with respect to the surface of the information recording region.

Making Method of Optical Recording Medium

A method of making an optical recording medium, including the steps of:

forming uniformly a recording layer on a substrate, the recording layer being made of a recording material being reversibly reactive to predetermined light; and causing an irreversible reaction in a partial region of the recording layer without causing a substantial difference in level with respect to the other region of the recording layer.

Optical Memory Devices (1) An optical memory device including:

an optical recording medium having a recording layer, and allowing recording and/or reproducing of information with respect to the recording layer with near-field light (evanescent light), the recording layer including an information recording region and a tracking region having substantially no difference in level with respect to the surface of the information recording region;

an exposing device having a head for emitting the near field light (evanescent light) to the optical recording medium;

a drive device for driving the head; and a control device for controlling the drive device to perform tracking of the head in accordance with the tracking region.

(2) An optical memory device for accommodating an optical recording medium, and utilizing near-field light (evanescent light) for performing near-field light recording of information onto the optical recording medium and/or near-field light reproducing of information from the optical recording medium, the optical recording medium having a recording layer, and allowing recording and/or reproducing of information with respect to the recording layer with the near-field light (evanescent light), the recording layer including an information recording region and a tracking region having substantially no difference in level with respect to the surface of the information recording region, and the tracking region being used for tracking.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1(A) and 1(B) show by way of example a schematic structure of an optical recording medium according to the invention.

FIGS. 2(A) and 2(B) show a schematic structure of another example of the optical recording medium according to the invention.

FIGS. 4(A), 4(B) and 4(C) show by way of example steps of making an optical recording medium shown in FIG. 1(A)

FIGS. 5(A)–5(C) show by way of example exposing devices which can be used for making the optical recording medium according to the invention.

FIGS. 8(A) and 8(B) show an example of tracking performed with evanescent light on the optical recording medium used for near-field light recording and reproducing of information.

FIGS. 9(A)–9(C) are graphs showing distributions of intensity of light detected by a tracking signal detector in the radial direction of the optical recording medium with respect to the position of the head.

FIGS. 11(A) and 11(B) are graphs showing changes in amount of light detected by a signal detector using a probe with respect to time during information reproducing.

DESCRIPTION OF THE PREFERRED EMBODIMENTS

Embodiments of the invention will now be described with reference to the figures.

Figure 1A:
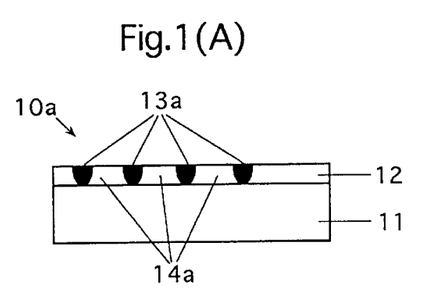
FIG. 1(A) is a side view fragmentarily showing the optical recording medium provided with concentric or spiral tracking pattern(s)
Figure 1B:
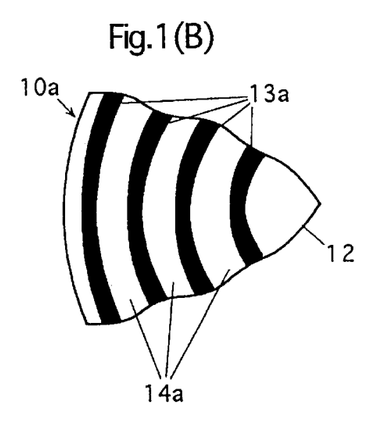
FIG. 1(B) is a plan fragmentarily showing the optical recording medium shown in FIG. 1(A)
Figure 2A:
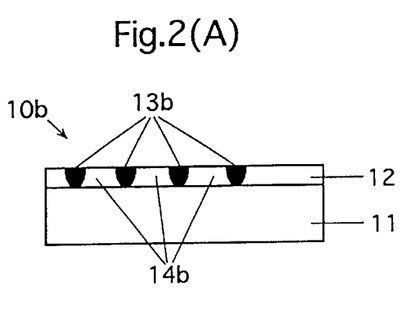
FIG. 2(A) is a side view fragmentarily showing the optical recording medium provided with a tracking pattern, in which point pattern groups each formed of three point patterns arranged in a predetermined direction are arranged in the circumferential direction of the substrate with a predetermined space between each other.
Figure 2B:
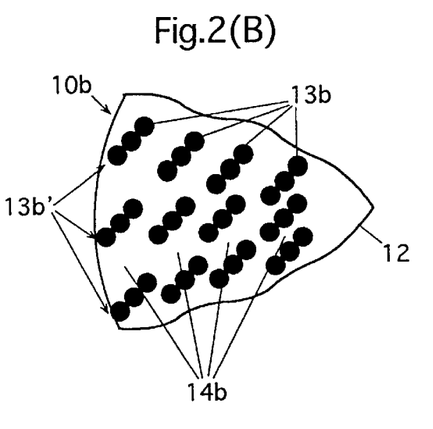
FIG. 2(B) is a plan fragmentarily showing the optical recording medium shown in FIG. 2(A)

FIGS. 1(A) and 1(B) and FIGS. 2(A) and 2(B) show by way of example schematic structures of optical recording mediums according to the invention. FIG. 1(A) is a side view fragmentarily showing the optical recording medium 10a which is provided with concentric or spiral tracking pattern(s) 13a, and FIG. 1(B) is a plan fragmentarily showing the optical recording medium shown in FIG. 1(A). FIG. 2(A) is a side view fragmentarily showing the optical recording medium 10b provided with a tracking pattern 13b, in which point pattern groups 13b' each formed of three point patterns arranged in a predetermined direction are arranged in the circumferential direction of the substrate with a predetermined space between each other, and FIG. 2(B) is a plan fragmentarily showing the optical recording medium shown in FIG. 2(A).

Optical recording mediums 10a and 10b shown in FIGS. 1(A) and 1(B) and FIGS. 2(A) and 2(B) are used for recording and/or reproducing information with predetermined light, and each have a substrate 11 and a recording layer 12 formed on the substrate 11. In the recording layers 12, the optical recording mediums 10a and 10b include information recording regions 14a and 14b as well as tracking patterns 13a and 13b, respectively. The tracking patterns 13a and 13b have optical characteristics different from those of the regions 14a and 14b, have surfaces having substantially no difference in level from the surface of the regions 14a and 14b, and are recorded in a fixed fashion so as to prevent change by the predetermined light, respectively.

These optical recording mediums 10a and 10b have the structures formed in an optical recording medium making method, which will be described later, and more specifically, have the structures, in which the information recording regions 14a and 14b as well as the tracking patterns 13a and 13b having optical characteristics different from those of the regions 14a and 14b are formed on the recording layers 12 formed on the substrates 11, respectively.

In the optical recording mediums 10a and 10b shown in FIGS. 1(A) and 2(A), as already described, the tracking patterns 13a and 13b are recorded in the fixed fashion on the recording layers 12 formed on the substrates 11 so that the predetermined light applied for recording and/or reproducing the information may not change the tracking patterns 13a and 13b, respectively. The tracking patterns 13a and 13b have the optical characteristics different from those of the information recording regions 14a and 14b, and have surfaces which are not substantially different in level from the surfaces of the regions 14a and 14b, respectively.

The state that the surface of the tracking pattern is not substantially different in level from the surface of the information recording region means such states that no differece in level is present, or that a difference in level is microscopically present but this difference cannot be recognized with a head or probe used for recording and/or reproducing the information.

In the case of recording and/or reproducing, e.g., with evanescent light (and naturally in the case not using the evanescent light), the difference smaller than about 10 nm is the unrecognizable differece providing the structure, which "does not substantially have the difference in level". Preferably, the unrecognizable difference providing the structure, which "does not substantially have the difference in level" is a difference of several nanometers or less which cannot be detected by an optical microscope and a near-field optical microscope, and more preferably, is merely small irregularities which unavoidably occur due to change in molecular structure during formation of the tracking pattern.

In the optical recording mediums 10a and 10b, the tracking patterns 13a and 13b differ from the information recording regions 14a and 14b only in optical characteristics, and have surfaces which are not substantially different in level from the surfaces of the regions 14a and 14b. Only the optical characteristics of the tracking patterns 13a and 13b are utilized as the tracking information for performing the tracking. Therefore, tracking can be performed more accurately than a conventional optical recording medium having a tracking pattern (tracking guide) which is formed of a groove or pits inevitably have large manufacturing errors.

In the optical recording mediums 10a and 10b, the tracking patterns 13a and 13b are formed such that the surfaces thereof do not substantially have difference in level from the surfaces of information recording regions 14a and 14. Therefore, it is possible to maintain a predetermined distance between the head or probe for information recording and reproduction and each of the optical recording mediums 10a and 10b while performing accurate tracking of the tracking pattern 13a or 13b even in the case where the predetermined light must be emitted from a position near the optical recording medium 10a or 10b for information recording or reproducing and, e.g., for near-field light recording or reproducing of information utilizing the evanescent light.

From the above, the optical recording mediums shown in the figures may be typically such optical recording mediums that the evanescent light is used as the predetermined light for information recording and reproducing, and the optical recording medium is used for the near-field light recording and/or reproducing of the information utilizing the evanescent light.

In the case where the optical recording medium is used for the near-field light recording and/or reproducing utilizing the evanescent light, the distance on the order of nanometers between the head or probe for information recording and/or reproducing and the optical recording medium can be easily controlled by employing a flying head or the like.

The tracking patterns 13a and 13b have the surfaces, which are not substantially different in level from the surfaces of the information recording regions 14a and 14b, respectively, and the surfaces of the patterns 13a and 13b and the regions 14a and 14b are substantially at the same level as the outermost surface of the recording layer 12 on the substrate 11. Owing to these structures, the light can reach the tracking patterns 13a and 13b even if the evanescent light is used for tracking, and therefore the tracking can be executed.

Naturally, the optical recording mediums 10a and 10b may be such mediums that allow recording and/or reproducing of information with light such as ordinary light other than the evanescent light, or that allow tracking with ordinary light other than the evanescent light.

The tracking pattern 13a shown in FIG. 1(B) is a concentric or spiral pattern as already described. This pattern can be used for tracking servo in a continuous servo type such as a push-pull type or a three-beam type. The tracking pattern 13b shown in FIG. 2(B) is formed of point pattern groups 13b', which are arranged in the circumferential direction of the substrate 11 with a predetermined space between each other, and each are formed of the three point patterns arranged in the predetermined direction. This pattern can be used for the tracking servo of, e.g., the continuous servo system of the three-beam type or the sample servo system.

In the optical recording mediums 10a and 10b, the information recording regions 14a and 14b have optical characteristics different from those of the tracking patterns 13a and 13b, respectively, as already described. As a specific example of such differences, the patterns 13a and 13b may have the reflectances (i.e., reflectivities) or transmittances (transmissivities) with respect to the predetermined light for information recording and reproducing, which are different from the reflectances or transmittances of the regions 14a and 14d, respectively. This example utilizes the feature that the reflectances of the patterns 13a and 13b are different from the reflectances of the regions 14a and 14b.

Figure 3:
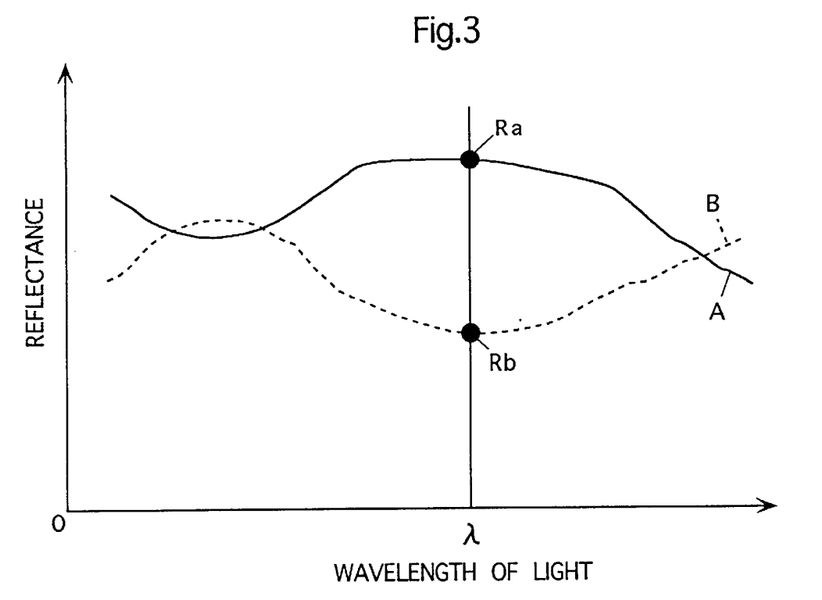
FIG. 3 is a graph showing relationships between a wavelength of the light and a reflectance, which are determined in the operations of emitting the light to the optical recording mediums shown in FIG. 1(A) and FIG. 2(A), respectively.

FIG. 3 shows relationships between the wavelength of the light emitted to the optical recording mediums 10a and 10b shown in FIGS. 1(A) and 2(A) and the reflectance of the same. In FIG. 3, "A" represents a graph of the reflectances of the tracking patterns 13a and 13b, and "B" in FIG. 3 represents a graph of the reflectances of the recording layers 12 (information recording regions 14a and 14b) other than the tracking patterns 13a and 13b. With respect to the light having the wavelength of λ, the tracking patterns 13a and 13b exhibit the reflectance Ra, and the information recording regions 14a and 14b exhibit the reflectance Rb.

As shown in FIG. 3, the reflectance Ra of the tracking patterns 13a and 13b with respect to the wavelength λ is different from the reflectance Rb of the information recording regions 14a and 14b.

In the optical recording mediums 10a and 10b, as described above, the predetermined light of the wavelength of, e.g., λ is used for information recording and/or reproducing, whereby the difference in reflectance between the tracking patterns 13a and 13b and the information recording regions 14a and 14b is detected, and the detected difference can be utilized as the tracking information. If the difference in reflectance of (Ra–Rb) is in a range from about 5% to about 10%, it can be detected.

In this case, the tracking patterns 13a and 13b are recorded in a fixed fashion on the recording layers 12 so that the predetermined light (i.e., the light of wavelength of λ in this example) may not change the tracking patterns 13a and 13b. Therefore, the tracking patterns 13a and 13b do not change even if they are irradiated with the predetermined light.

Although the difference in reflectance has been described as an example of the difference in optical characteristics between the information recording regions 14a and 14b and the tracking patterns 13a and 13b, the difference in transmittance may be utilized. In the latter case, the difference in transmittance between the tracking pattern and the information recording region can be utilized as the tracking information.

The reflectance (or transmittance) may be utilized for recording and/or reproducing the information, and the transmittance (or reflectance) may be utilized for the tracking. This manner is further effective in the tracking.

Instead of the reflectance and the transmittance, such a situation may be utilized that the difference in polarization direction between the reflected light and the incident light on the tracking pattern is different from the difference in polarization direction between the reflected light and the incident light on the information recording region.

A method of manufacturing the optical recording medium 10a shown in FIGS. 1(A) and 1(B) will now be described with reference to the FIG. 4.

FIGS. 4(A) to 4(D) show by way of example the steps of making the optical recording medium 10a shown in FIG. 1(A), and specifically show a progression of states during making of the optical recording medium 10a.

Figure 4A:
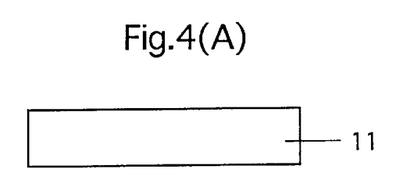
FIG. 4(A) shows a state where a substrate is prepared.
Figure 4B:
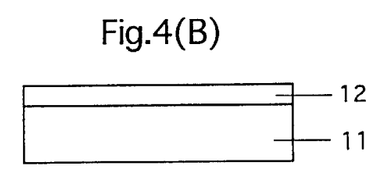
FIG. 4(B) shows a state where a recording layer is uniformly formed on the substrate.

First, the substrate 11 is prepared as shown in FIG. 4(A). Then, as shown in FIG. 4(B), the recording layer 12 made of a recording material, which causes a reversible reaction in response to the predetermined light for recording and reproduction, is formed uniformly. A desired thickness of the recording layer 12 is in a range from 1 nm to 500 nm, and is 100 nm in this example. The recording layer 12 may be formed in a well-known method such as a sputtering method, a vapor deposition method or a spin coating method.

Figure 4C:
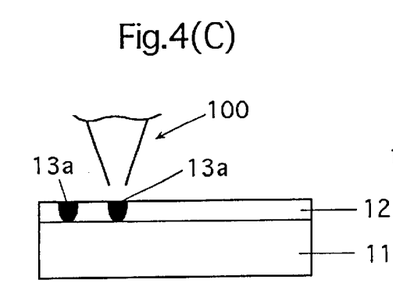
FIG. 4(C) shows a state where a tracking pattern is formed on the recording layer.
Figure 5A:
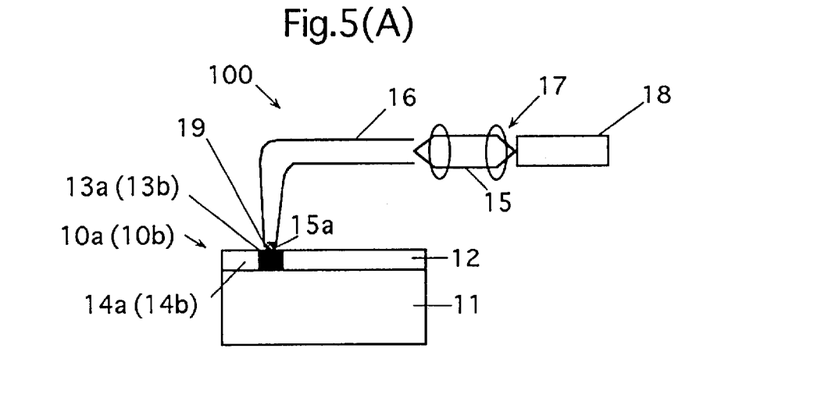
FIG. 5(A) is a side view showing schematic structures of the exposing device using a fiber probe as a near-field probe issuing evanescent light as well as the optical recording medium.

Thereafter, as shown in FIG. 4(C), an exposing device 100 which is shown in FIG. 5(A) and will be described later causes an irreversible reaction on a partial region of the recording layer 12 so that the tracking pattern 13a which does not cause a reversible reaction in response to the predetermined light is formed in the above partial region. The region other the tracking pattern 13a in the recording layer 12 can be utilized as the information recording region 14a.

Figure 4D:
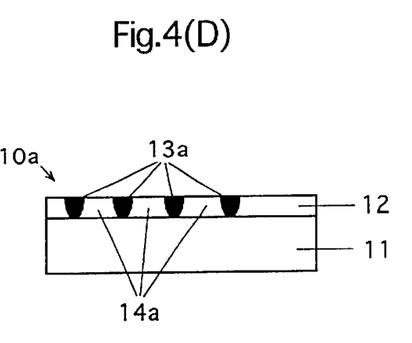
FIG. 4(D) shows the optical recording medium after forming the tracking pattern.

The width of the tracking pattern 13a, and more specifically, the line width of the concentric or spiral pattern 13a in this example depends on the exposing device to be described later, but is preferably smaller than about 200 nm if the evanescent light is utilized for tracking, and is equal to 150 nm in this example. In this manner, the optical recording medium 10a provided with the tracking pattern 13a is completed as shown in FIG. 4(D).

The tracking pattern 13a thus formed has the optical characteristics (reflectance, in this example) different from those of the information recording region 14a, and has the surface which does not have a substantial difference in level with respect to the surface of the region 14a.

In the optical recording medium 10a obtained in this making method, the information recording region 14a causes the reversible reaction in response to the predetermined light. Therefore, recording and erasing of the information can be performed, and in other words, rewriting of the information can be performed.

The difference in level may be present between the surface of the tracking pattern 13a and the information recording region 14a (i.e., the region other than the pattern 13a)on the recording layer 12, and it is preferable that this difference has a magnitude of several nanometers or less, which cannot be detected by the conventional optical microscope and the conventional near-field light optical microscope (NSOM). The difference in reflectance with respect to the predetermined light between the pattern 13a and the region 14a is desirably 5% or more, is more desirably 10% or more, and is preferably at least in a range from 5% to 10%.

The optical recording medium 10b can be made similarly to the optical recording medium 10a.

Figure 5B:
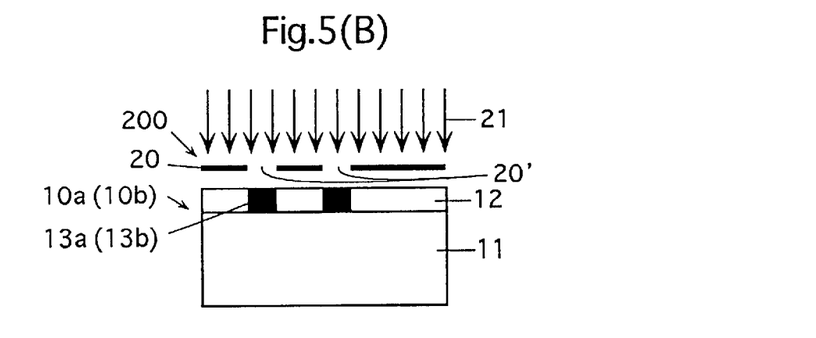
FIG. 5(B) is a side view showing schematic structures of an exposing device using a fine-processed mask for tracking pattern formation as well as an optical recording medium.
Figure 5C:
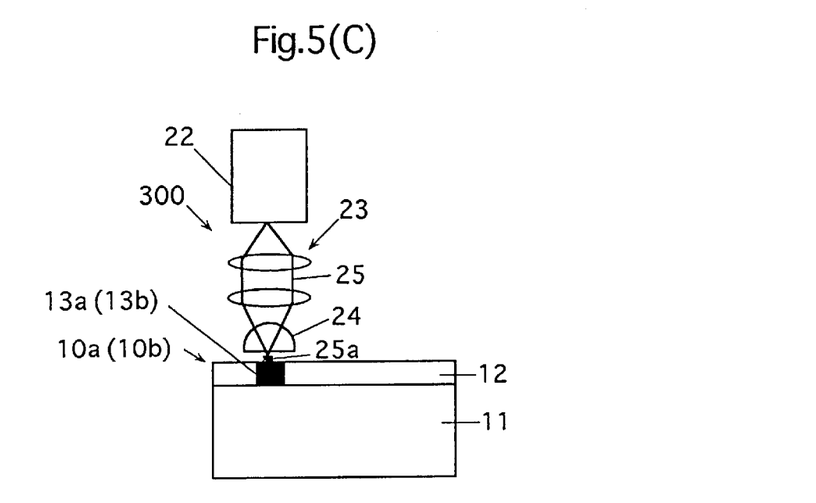
FIG. 5(C) is a side view showing schematic structures of an exposing device using a solid immersion lens (SIL) as a near-field probe generating evanescent light as well as an optical recording medium.

FIGS. 5(A) to 5(C) show by way of example the exposing devices which can be used for making the optical recording medium according to the invention. Description will now be given successively with reference to these figures. For making the optical recording mediums 10a and 10b, steps in a predetermined method are executed in advance to form the recording layer 12, which is uniformly formed on the substrate 11, is made of the recording material and causes a reversible reaction in response to the predetermined light used for recording and reproducing of the information.

First, an example of the exposing device (i.e., device 100) which can be used for making the optical recording mediums 10a and 10b shown in FIGS. 1(A) and 2(A) will be described with reference to FIG. 5(A).

FIG. 5(A) is a side view showing schematic structures of an exposing device 100, which uses a fiber probe 16 as a near-field probe emitting evanescent light, as well as optical recording medium 10a or 10b.

The exposing device 100 shown in FIG. 5(A) includes the fiber probe 16, a coupling lens system 17 and a light source 18.

The light source 18 is formed of a gas laser device or a semiconductor laser device, and can emit laser light 15 of a relatively large power of about 20 mW in this example to the coupling lens system 17.

The coupling lens system 17 can guide the laser light 15 emitted from the light source 18 to the fiber probe 16.

The fiber probe 16 is formed of an optical fiber, and is provided at its end with a minute opening 19. The minute opening 19 has an opening size not larger than the wavelength of the light, and can issue therefrom evanescent light 15a. Thereby, the probe 16 can irradiate the recording layer 12 with the evanescent light 15a issued from the minute opening 19.

The minute opening 19 of the fiber probe 16 is formed by sharpening processing, which is performed in the well-known etching method as well as the heating and pulling method, and metal coating processing. For emitting the evanescent light to the recording layer 12, the distance between the minute opening 19 of the probe 16 and the recording layer 12 is kept constant. For the above, this example employs a shear force method, in which a piezo-element for exciting causes resonance of the probe 16, changes in vibration amplitude of the end of the probe 16, which is located near the surface of the recording layer 12, is detected, and the distance between the probe 16 and the surface of the recording layer 12 is controlled based on the changes thus detected.

Although this example uses the probe 16, a flat plate-like member provided with a minute opening, through which the evanescent light is issued, may be used. In the latter case, a method of employing a flying head can be used for keeping the constant distance between the minute opening and the recording layer.

In the exposing device 100, the evanescent light 15a is emitted to the partial region of the recording layer 12 through the minute opening 19 of the probe 16, and thereby causes the irreversible reaction to form in the above partial region the predetermined tracking pattern 13a or 13b, in which the predetermined light for information recording and reproducing cannot cause a reversible reaction. The laser light 15 emitted from the light source 18 is led to the fiber probe 16 by the coupling lens system 17. The evanescent light 15a is emitted to the recording layer 12 from the minute opening 19, which is formed at the end of the probe 16 and has the opening size smaller than the wavelength of the light. During this operation, the substrate 11 and the recording layer 12 are moved relatively to the probe 16 while keeping a distance substantially equal to half the opening size of the opening 19 from the opening 19. In this manner, the predetermined tracking pattern 13a or 13b can be formed on the recording layer 12.

Another example of the exposing device (i.e., device 200) which can be used in the method of making the optical recording mediums 10a and 10b will now be described with reference to FIG. 5(B).

FIG. 5(B) is a side view showing schematic structures of the exposing device 200, which uses a finely processed mask for tracking pattern formation, as well as the optical recording medium 10a or 10b.

The exposing device 200 includes a mask 20 for tracking pattern formation. The mask 20 is provided with finely processed apertures 20' for forming patterns of the tracking pattern on the recording layer 12. The mask 20 is arranged above the recording layer 12, and is irradiated with light 21 emitted from a light source, which is not shown and is arranged at a higher position. Thereby, predetermined tracking pattern 13a or 13b is formed on the recording layer 12.

Still another example of the device (i.e., a device 300) which can be used for making the optical recording mediums 10a and 10b will now be described with reference to FIG. 5(C).

FIG. 5(C) is a side view showing schematic structures of the exposing device 300, which uses a solid immersion lens (SIL) 24 as the near-field probe emitting the evanescent light, as well as the optical recording medium 10a or 10b.

The exposing device 300 shown in FIG. 5(C) includes a light source 22, a coupling lens system 23 and a solid immersion lens 24.

The light source 22 can emit light 25 to the coupling lens system 23.

The coupling lens system 23 can lead the light 25 emitted from the light source 22 to the solid immersion lens 24.

The solid immersion lens 24 can produce evanescent light 25a from the light 25 led by the coupling lens system 23. Thereby, the recording layer 12 can be irradiated with the evanescent light 25a generated by the solid immersion lens 24.

In the exposing device 300, the partial region of the recording layer 12 is irradiated with the spot light (evanescent light) 25a gathered by solid immersion lens 24 to cause an irreversible reaction and thereby form the tracking pattern 13a or 13b, which does not cause the reversible reaction in response to the predetermined light for information recording and reproducing. For this processing, the laser light 25 emitted from the light source 22 is led to the solid immersion lens 24 by the coupling lens system 23. The solid immersion lens 24 emits the evanescent light 25a to the recording layer 12. In this operation, the substrate 11 and the recording layer 12 are moved relatively to the solid immersion lens 24 while keeping the predetermined distance to the lens 24. Thereby, the predetermined tracking pattern 13a or 13b can be formed on the recording layer 12.

With reference to FIG. 4, description will now be given on an example of the method of making the optical recording medium using the recording layer, which contains a photochromic material exhibiting a photochromic reaction. In the following description, the method of making the optical recording medium shown in FIG. 4 is employed, but the exposing device 200 shown in FIG. 5(B) is used instead of the exposing device 100 in FIG. 5(A) which is used for the method shown in FIG. 4 in the foregoing description.

The photochromic material has following features. According to the photochromic reaction of the photochromic material, when the photochromic material in the state of A is irradiated with light of a wavelength which can be absorbed in the state of A, the material attains a state of B, in which light of a different wavelength is absorbed. Also, when the photochromic material in the state of B is irradiated with the light of the wavelength which can be absorbed in the state of B, the material returns to the initial state of A. Thus, the photochromic reaction is the reversible reaction causing the changes in state as described above.

Figure 6:
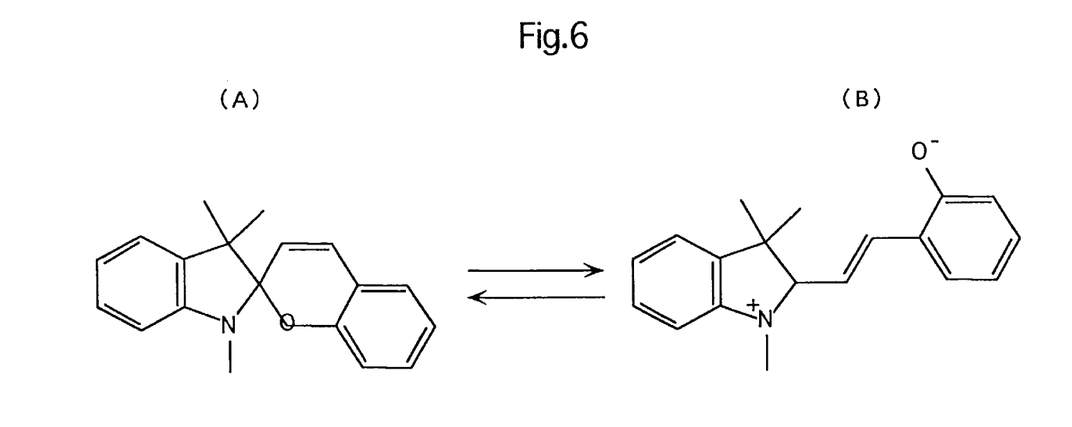
FIG. 6 shows structural formulas of a spiropyran compound which is a photochromic material, and shows a structural formula of the spiropyran material in the state "A" and a structural formula of the spiropyran material in the state "B"
Figure 7:
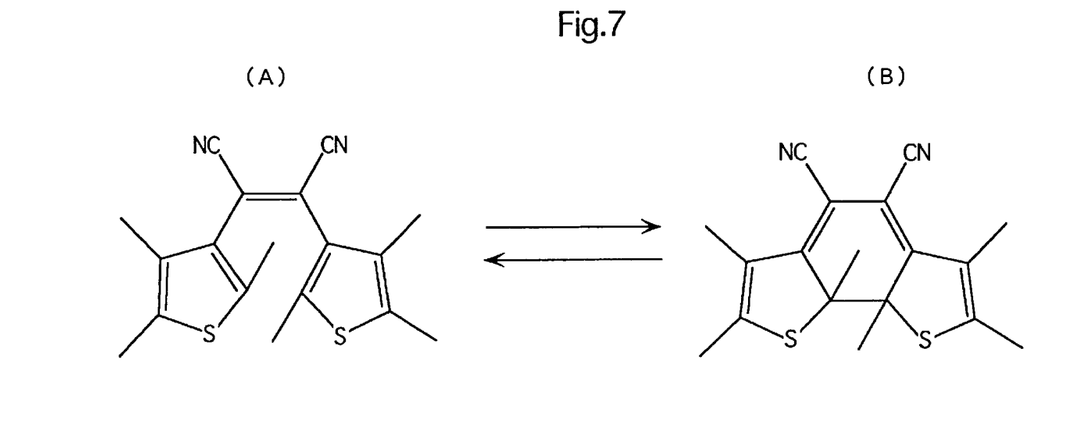
FIG. 7 shows structural formulas of diarylethene compound which is the photochromic material, and shows a structural formula of the diarylethene material in the state "A", and a structural formula of the diarylethene material in the state "B"

FIG. 6 shows structural formulas of spiropyran compound which is the photochromic material. On the left side, FIG. 6 shows a structural formula of the material in the state "A". On the right side, FIG. 6 shows a structural formula of the material in the state "B". FIG. 7 shows structural formulas of diarylethene compound which is the photochromic material. On the left side, FIG. 7 shows a structural formula of the material in the state "A". On the right side, FIG. 7 shows a structural formula of the material in the state "B".

The optical recording medium including the photochromic material in the recording layer can be configured such that the states of "A" and "B" correspond to the information unrecorded state and the information recorded state, respectively, or correspond to the information recorded state and the information unrecorded state, respectively, whereby rewriting of the information can be performed.

As shown in FIG. 4(A), the recording layer 12 made of the spiropyran compound, which is the photochromic material (see FIG. 6), and the polystyrene resin is formed on the substrate 11 by the spin coating method (see FIG. 4(B)).

The reason for which the polystyrene resin is used in the recording layer 12 is as follows. The polystyrene resin is used as a binder resin for the purposes of, e.g., improving the adhesion strength of the recording layer 12 to the substrate 11 and improving the mechanical strength of the recording layer 12. As a further important reason, the spiropyran compound used in the recording layer 12 does not exhibit the photochromic reaction when it is solely in the crystalline state, and it is necessary to disperse uniformly the spiropyran compound in the binder resin such as a polystyrene resin for using the spiropyran compound in the recording layer 12. If the composition rate of the spiropyran compound with respect to the polystyrene resin is low, the information recording sensitivity is impaired. If the rate is excessively high, the crystal of spiropyran compound which does not exhibit the photochromic reaction, is deposited so that the information recording sensitivity is likewise impaired. Accordingly, the composition rate of the photochromic material to the resin is preferably 4:6 by weight.

Since the recording layer 12 thus formed exhibits the transparent state, and the state where it is colored by irradiation with ultraviolet rays having a wavelength of 365 nm is employed as the initial state.

The coloring of the recording layer will now be described with reference to FIGS. 6 and 7. The coloring of the recording layer occurs as a result of proceeding of the photo-isomerization (i.e., photochromic reaction and thus reversible reaction) shown in FIGS. 6 and 7. In the initial state immediately after formation of the recording layer, all the photochromic compound in the recording layer is in the state "A" shown in FIGS. 6 and 7, and therefore hardly absorbs the light of the wavelength in the visible range. However, the compound in the state "B" in FIGS. 6 and 7, which is attained by irradiation with light, absorbs the light of the wavelength in the visible range.

In the recording layer 12 of this example, therefore, the recording layer 12 is colored for utilizing the changes in reflectance caused by coloring (shift of the absorbed wavelength).

For causing an irreversible reaction in a partial region of the recording layer 12 with the mask exposing device 200 shown in FIG. 5(B), strong light (i.e., laser light of an output power of 20 mW and a wavelength of 196 nm in this example) which changes the characteristics of the photochromic material is emitted to the above partial region. This lowers the reflectance of the above region (tracking pattern 13a). This change is irreversible. This change is owing to the fact that the irreversible change is induced in the photochromic material, and it can be considered that the photochromic material irradiated with the laser light of a high intensity and a short wavelength irreversibly changed in its characteristics after attaining a highly excited state. In this manner, the optical recording medium 10a (see FIG. 4(D)) is produced. In the optical recording medium 10a thus formed, the spiral tracking pattern 13a of about 150 nm in width is recorded in the fixed fashion on the recording layer 12. The difference in reflectance between the tracking pattern 13a and the information recording region 14a is about 10%. With this optical recording medium 10a, the tracking of the continuous servo system of the three-beam type was performed. Sufficient following of the recording head was confirmed.

With reference to FIGS. 4(A) to 4(D), description will now be given on another example of the method of making the optical recording medium using the recording layer which contains the photochromic material exhibiting the photochromic reaction.

On the substrate 11 shown in FIG. 4(A), the recording layer 12 is formed by the spin coating method (see FIG. 4(B)). The recording layer 12 is formed of the diarylethene compound (see FIG. 7), which is the photochromic material, and the polystyrene resin. In this example, the composition rate between the photochromic material and the resin is 7:3 by weight.

Since the recording layer 12 thus formed exhibits the transparent state, and the state where it is colored by irradiation with the ultraviolet rays of 365 nm in wavelength is used as the initial state. This coloring is performed for the purpose of using the laser light of the wavelength in the visible range.

In the recording layer 12, an irreversible reaction is caused at a partial region by the mask exposing device 200 shown in FIG. 5(B). For causing the above reaction, this partial region is irradiated with strong light (in this example, the laser light of 20 mW in output power and 514 nm in wavelength) which heats the polymer to or above the transition temperature for polycrystallizing the photochromic material (see FIG. 4(C)). This increases the reflectance of the region (tracking pattern 13a). This is probably because the photochromic material is polycrystallized in the laser irradiated portion. In other words, the polymer irradiated with the strong laser light is partially softened so that the photochromic materials in the softened portion approach each other and thereby crystallize. In this manner, the optical recording medium 10a having the recording layer 12, in which the tracking pattern 13a of about 150 nm in width is fixedly recorded, is obtained (see FIG. 4(D)). The difference in reflectance between the tracking pattern 13a and the information recording region 14a is about 15%.

With reference to FIGS. 4(A) to 4(D), description will now be given on still another example of the method of making the optical recording medium using the recording layer which contains the photochromic material exhibiting the photochromic reaction.

On the substrate 11 shown in FIG. 4(A), the recording layer 12 is formed by the spin coating method (see FIG. 4(B)). The recording layer 12 is formed of the diarylethene compound (see FIG. 7), which is the photochromic material, dicyanobenzene (i.e., acceptor material) and the polystyrene resin. In this example, the composition rate among the photochromic material, the acceptor material and the resin is 2:3:5 by weight.

In the recording layer 12, an irreversible reaction is caused at a partial region by the mask exposing device 200 shown in FIG. 5(B). For causing the above reaction, this partial region is irradiated with strong light (in this example, the laser light of 20 mW in output power and 514 nm in wavelength) which forms complex between the photochromic material and the acceptor material (see FIG. 4(C)). This lowers the reflectance of the above region (tracking pattern 13a). In view of the fact that the absorption wavelength of the recording layer 12 shifts in the laser irradiated portion, it can be considered that the polymer irradiated with the strong laser light is partially softened so that the photochromic material and the acceptor material approach each other to form the complex. In this manner, the optical recording medium 10a having the recording layer 12, in which the tracking pattern 13a of about 150 nm in width is fixedly recorded, is obtained (see FIG. 4(D)). The difference in reflectance between the tracking pattern 13a and the information recording region 14a is about 13%.

An example of tracking will now be described. In the following example, the optical recording mediums 10a and 10b shown in FIGS. 1(A) and 2(A) are provided with the tracking patterns 13a and 13b, which can be used for both the near-field light recording and the near-field light reproducing of the information utilizing the evanescent light.

Figure 8A:
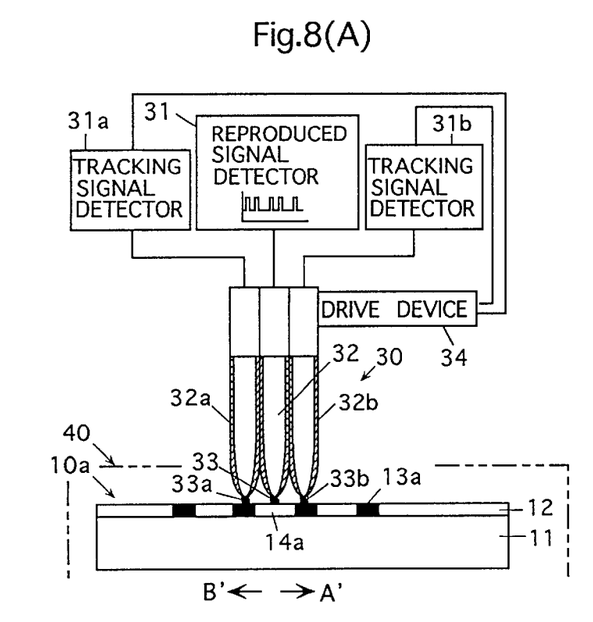
FIG. 8(A) is a side view showing schematic structures of an optical memory device capable of both the near-filed light recording and reproducing as well as the optical recording medium.
Figure 8B:
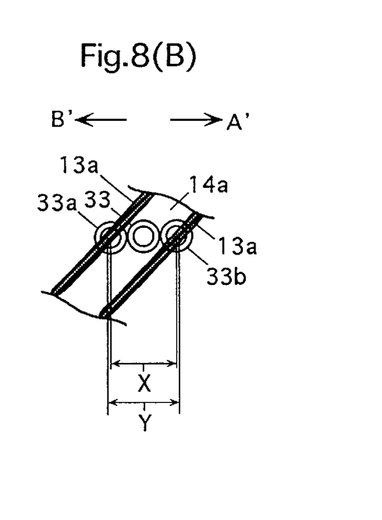
FIG. 8(B) is a top view of the optical recording medium and a light spot emitted thereto.

FIGS. 8(A) and 8(B) show by way of example the tracking, which is performed with the evanescent light on the optical recording medium 10a used for the near-field light recording and reproducing of the information. FIG. 8(A) is a side view showing the optical recording medium 10a and schematic structures of an the optical memory device which performs both the near-field light recording and reproducing. FIG. 8(B) is a top view of the optical recording medium 10a and the light spot emitted thereto. The tracking employed in this example is the continuous servo system of the three-beam type. In the optical recording medium 10a used in this example, the reflectance of the tracking pattern 13a is larger than the reflectance of the information recording region 14a.

The optical memory device shown in FIG. 8(A) includes a head 30 for recording and reproducing as well as a recording medium accommodating portion 40.

The recording medium accommodating portion 40 includes a rotary drive device (not shown), and accommodates the optical recording medium 10a of the disk form. The optical recording medium 10a is driven to rotate by the rotary drive device.

The head 30 includes a probe 32 for recording and reproducing as well as two tracking probes 32a and 32b arranged on the opposite sides of the probe 32. The head 30 is arranged near the surface of the optical recording medium, and can perform the near-field light recording and reproducing of the information utilizing the evanescent light. Also, a probe drive device 34 can move the head 30 in the radial direction (i.e., the directions indicated by A' and B' in FIGS. 8(A) and 8(B)) of the disk-like optical recording medium based on the tracking information, which will be described later.

The probe 32 for recording and reproducing can generate evanescent light 33. Thereby, the light 33 for the recording based on the record information can be emitted to the information recording region 14a in the information recording operation, and the light 33 for reproducing can be emitted thereto in the information reproducing operation. The probe 32 is connected to a reproduced signal detector 31. In the information reproducing operation, the probe 32 converts the reflected light coming from the information recording region 14a into a reproduced signal, and sends it to the detector 31. The detector 31 can detects the reproduced signal to allow reading of the information recorded on the information recording region 14a.

The tracking probes 32a and 32b can issue evanescent light 33a and 33b for tracking to the tracking pattern 13a.

As shown in FIG. 8(B), each of the probes 32a, 32 and 32b is slightly inclined with respect to the track so that a light spot distance X between the light 33a and 33b may be substantially equal to a track distance Y. The track distance Y is slightly larger than the light spot distance X.

The tracking probes 32a and 32b are connected to tracking signal detectors 31a and 31b so that they can convert the light reflected from the tracking pattern 13a into the tracking signals, and send these signals to the detectors 31a and 31b, respectively. The detectors 31a and 31b can detect the tracking signals, and can send them as the tracking information to the probe drive device 34.

Figure 9A:
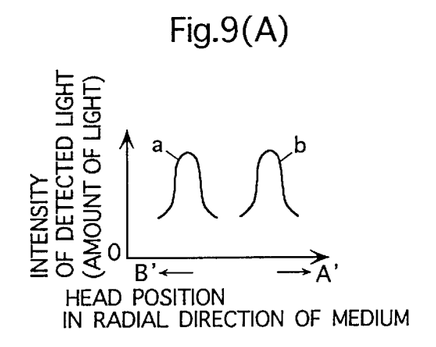
FIG. 9(A) is a graph showing a state where the head performs accurate tracking.
Figure 9B:
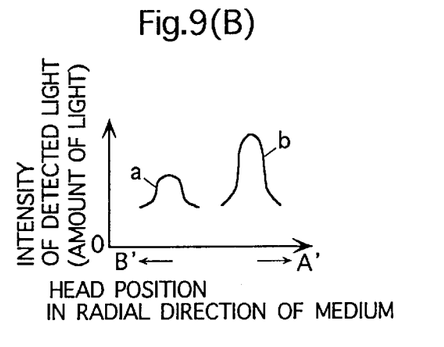
FIG. 9(B) is a graph showing a state where the head is shifted in the direction of an arrow A' in FIGS. 8(A) and 8(B)
Figure 9C:
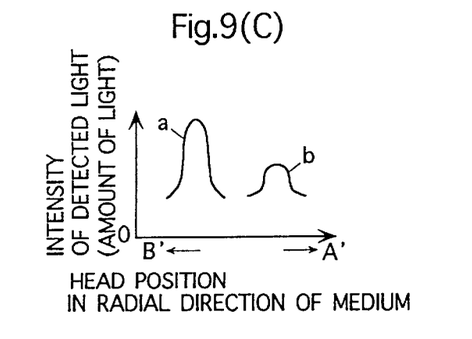
FIG. 9(C) is a graph showing a state where the head is shifted in a direction of an arrow B' in FIGS. 8(A) and 8(B)

FIGS. 9(A) to 9(C) are graphs showing distributions of intensities of the light detected by the tracking signal detectors 31a and 31b with respect to the position of the head 30 in the radial direction of the optical recording medium. FIG. 9(A) shows a state where the head 30 performs the accurate tracking. FIG. 9(B) shows a state where the head 30 is shifted in the direction of an arrow A' in FIGS. 8(A) and 8(B). FIG. 9(C) shows a state where the head 30 is shifted in the direction of an arrow B' in FIGS. 8(A) and 8(B). In FIGS. 9(A), 9(B) and 9(C), "a" represents the intensity distribution of the light detected by the detector 31a via the probe 32a, and "b" represents the intensity distribution of the light detected by the detector 31b via the probe 32b.

Since the intensity distributions in FIG. 9(A) have peaks of an equal height, it can be understood that the light 33 shown in FIG. 8(A) is located in the substantially central position of the region 14a. In FIG. 9(B), since the intensity distribution "a" has a peak lower in level than that of the intensity distribution "b", it can be understood that the light 33 shown in FIG. 8(A) is shifted in the direction of an arrow A' from the center of the region 14a. In FIG. 9(C), since the intensity distribution "a" has a peak higher in level than that of the intensity distribution "b", it can be understood that the light 33 shown in FIG. 8(A) is shifted in the direction of an arrow B' from the center of the region 14a.

The probe drive device 34 does not move the head 30 when the tracking information sent from the tracking signal detectors 31a and 31b are in the state shown in FIG. 9(A). When the tracking information sent from the tracking signal detectors 31a and 31b are in the state shown in FIG. 9(B), the probe drive device 34 moves the head 30 in the direction of the arrow B' in FIG. 8(A). When the above tracking information are in the state shown in FIG. 9(C), the probe drive device 34 moves the head 30 in the direction of the arrow A' in FIG. 8(A). Thereby, the tracking of the continuous servo system in the three-beam type can be performed.

According to the memory device shown in FIG. 8(A), the head 30 for recording and reproducing is arranged near the surface of the optical recording medium 10a for performing the near-field light recording and reproducing of the information utilizing the evanescent light. The optical recording medium 10a is driven to rotate by the rotary drive device (not shown). In the information recording operation, the probe 32 issues the evanescent light 33 for information recording to the information recording region 14a so that the information is recorded. In the information reproducing operation, the probe 32 emits the evanescent light 33 for information reproduction to the information recording region 14a. The probe 32 converts the light reflected from the information recording region 14a to the reproduction signal, which is sent to the reproduced signal detector 31 so that the detector 31 reproduces the information. In the operation of recording and reproducing the information, the probes 32a and 32b emit the evanescent light 33a and 33b for tracking to the tracking pattern 13a. The light reflected from the pattern 13a is converted into the tracking signals by the probes 32a and 32b, and the signals thus converted are sent to the detectors 31a and 31b and the probe drive device 34. The drive device 34 does not move the head 30 if the tracking information sent from the tracking signal detectors 31a and 31b is in the state shown in FIG. 9(A). The drive device 34 moves it in the direction of the arrow B' in FIG. 8(A) if the above information is in the state shown in FIG. 9(B), and moves it in the direction of the arrow A' in FIG. 8(A) if the above information is in the state shown in FIG. 9(C).

According to the optical memory device shown in FIG. 8(A), since the optical recording medium 10a is accommodated therein, the information recording and reproducing can be performed while performing accurate tracking and easily controlling the distance between the optical recording medium 10a and the head for information recording and reproducing. Since the tracking pattern 13a allows tracking with the evanescent light, not only the information recording (or reproducing) but also information reproducing can be performed with the evanescent light.

Figure 10:
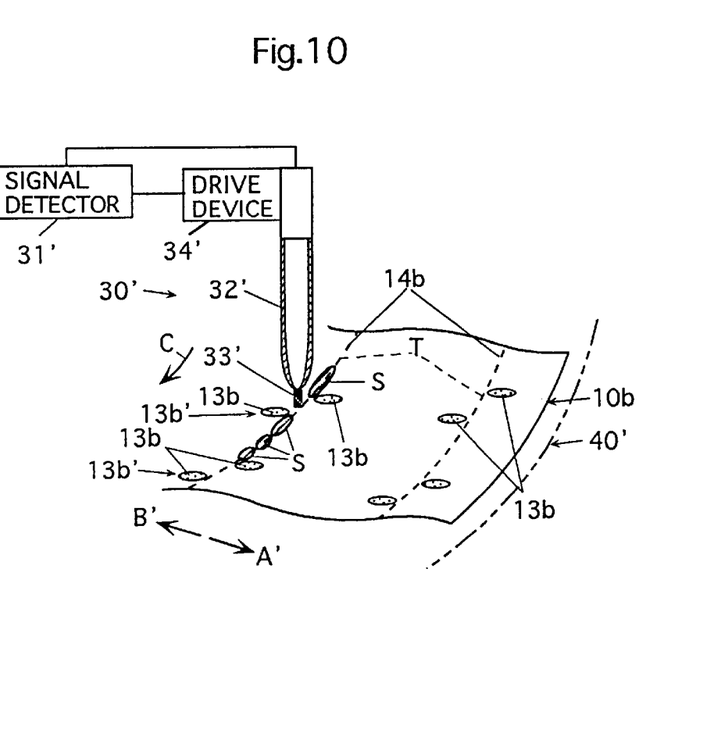
FIG. 10 shows another example of tracking performed with evanescent light on the optical recording medium used for near-field light recording and reproducing of information, and is a perspective view showing schematic structures of an optical memory device capable of the near-filed light recording and reproducing as well as the optical recording medium.

FIG. 10 shows another example of the tracking, which is performed with the evanescent light on the optical recording medium 10b used for the near-field light recording and reproducing of information, and is a perspective view showing schematic structures of an optical memory device capable of both the near-filed light recording and reproducing as well as the optical recording medium 10b. The tracking employed in this example is the sample servo system. The tracking pattern 13b in the optical recording medium 10b is formed of point pattern groups 13b', which are arranged in the circumferential direction of the substrate with a predetermined space between each other. Each point pattern group 13b' is formed of two point patterns arranged in the predetermined direction. In the optical recording medium 10b used in this example, the tracking pattern 13b has the reflectance smaller than that of the information recording region 14b.

The optical memory device shown in FIG. 10 includes a head 30' for recording and reproducing, and also includes a media accommodating portion 40'.

The recording medium accommodating portion 40' is provided with a rotary drive device (not shown), and accommodates the optical recording medium 10b of the disk form. The optical recording medium 10b is driven to rotate in a direction C in the figure by the rotary drive device.

The head 30' includes a probe 32' for recording and reproducing as well as tracking. The head 30' is located near the surface of the optical recording medium, and can perform the near-field light recording and reproducing of the information by utilizing the evanescent light. The head 30' can be moved by the probe drive device 34' in the radial direction (direction of the arrow A' or B' in FIG. 10) of the disk-like optical recording medium based on the tracking information which will be described later.

The probe 32' for recording and reproducing as well as tracking can issue evanescent light 33'. Thereby, the light 33' for recording and tracking based on the record information can be emitted to the information recording region 14b and the tracking pattern 13b on the track T in the information recording operation. Also, the light 33' for reproducing and tracking can be emitted to them in the information reproducing operation. The probe 32' is connected to the signal detector 31'. The probe 32' can convert the light, which is reflected from the information recording region 14b in the information reproducing operation, into the reproduced signal, and sends the signal to the signal detector 31'. The detector 31' can detect and read the reproduced signal.

The probe 32' can convert the light reflected from the tracking pattern 13b into the tracking signal, and can send the signal to the signal detector 31'. The detector 31' can detect the tracking signal, and can send it to the probe drive device 34' as the tracking information.

Figure 11A:
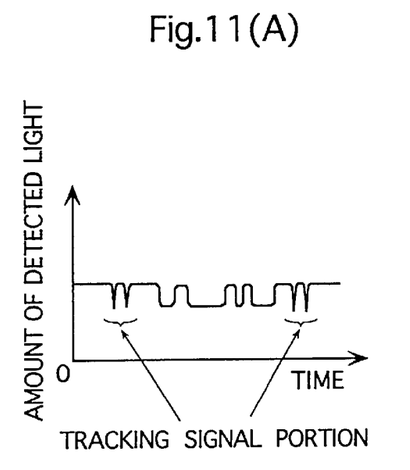
FIG. 11(A) is a graph showing a state where the head is accurately performing the tracking.
Figure 11B:
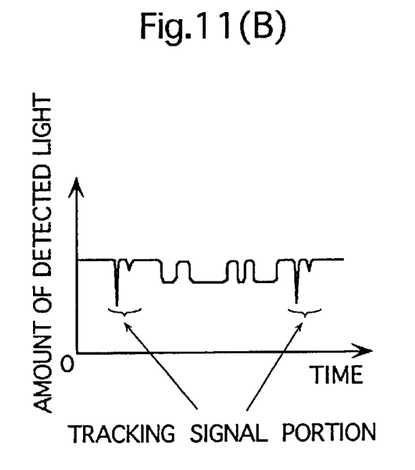
FIG. 11(B) is a graph showing a state where the head is shifted in the direction of an arrow B' in FIG. 10.

FIGS. 11(A) and 11(B) are graphs showing changes in amount of light, which is detected by the signal detector 31' via the probe 32' in the information reproducing operation, with respect to the time. FIG. 11(A) shows the state where the head 30' performs the accurate tracking, and FIG. 11(B) shows the state where the head 30' is shifted in the direction of the arrow B' in FIG. 10.

In FIG. 11(A), the peaks of the detected light amounts of the tracking signal portion have equal heights, which means that the light 33' shown in FIG. 10 is located substantially on the track T. In FIG. 11(B), the peaks of the detected light amounts of the tracking signal portion have different heights (the downward height of the left peak in the tracking signal portion is larger than the others), which means that the light 33' shown in FIG. 10 is shifted in the direction of the arrow B' from the track T. If the graph shows the opposite form (i.e., if the downward height of the left peak in the tracking signal portion is smaller than the others), this means that the light 33' shown in FIG. 10 is shifted in the direction of the arrow A' from the track T.

The probe drive device 34' does not move the head 30' when the tracking information supplied from the signal detector 31' is in the state shown in FIG. 11(A), and moves the head 30' in the direction of the arrow A' in FIG. 10 if the above information is in the state shown in FIG. 11(B). In the state opposite to that in FIG. 11(B), the head 30' is moved in the direction of the arrow B' in FIG. 10. In this manner, the tracking of the sample servo type can be performed.

According to the optical memory device shown in FIG. 10, the head 30' for recording and reproducing is arranged near the surface of the optical recording medium 10b for the near-field light recording and reproducing of the information utilizing the evanescent light. The optical recording medium 10b is driven to rotate by the rotary drive device (not shown). In the information recording operation, the probe 32' for recording and reproducing as well as tracking emits the evanescent light 33' for information recording and tracking to the information recording region 14b, and the information is recorded as record spots S. In the information reproducing operation, the probe 32' emits the evanescent light 33' for information reproducing and tracking to the information recording region 14b. The probe 32' converts the light, which is reflected from the information recording region 14b, into the reproduced signal, and sends it to the reproduced signal detector 31' so that the information is reproduced by the detector 31'. In the information recording and reproducing operation, the light reflected from the pattern 13b is converted into the tracking signal by the probe 32', and the signal thus converted is sent to the detector 31'. The probe drive device 34' does not move the head 30' when the tracking information sent from the signal detector 31' is in the state shown in FIG. 11(A), and moves the head 30' in the direction of the arrow A' in FIG. 10 when the above information is in the state shown in FIG. 11(B). In the state opposite to that in FIG. 11(B), the head 30' is moved in the direction of the arrow B' in FIG. 10.

According to the optical memory device shown in FIG. 10, since the optical recording medium 10b is accommodated therein, the information recording and reproducing can be performed while performing accurate tracking and easily controlling the distance between the optical recording medium 10b and the probe 32' for information recording and reproducing. Since the tracking pattern 13b allows tracking with the evanescent light, not only the information recording and reproducing but also the tracking can be performed with the evanescent light.

In the above examples, the optical recording mediums 10a and 10b are used in the optical memory device, which utilizes the evanescent light for the near-field light recording of the information onto the optical recording medium and the near-field light reproducing of information from the optical recording medium. Instead of this, the invention may be applied to such a case that the optical recording mediums 10a and 10b already bearing predetermined information are used in an optical memory device, which is dedicated to reproduction and utilizes the evanescent light for the near-field light reproducing of information from the optical recording medium.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording medium comprising:
   a substrate;
   an information recording region arranged on said substrate and capable of bearing information being readable with predetermined light; and
   a tracking region arranged on said substrate, having optical characteristics different from those of said information recording region and having substantially no difference in level with respect to the surface of said information recording region, wherein said tracking region is recorded in a state preventing change by said predetermined light, wherein
   said information recording region is a region including a photochromic material dispersed in polymer, and said tracking region is a pattern region formed by polycrystallizing the photochromic material in a portion of said information recording region, and thereby formed by recording in a fixed fashion to prevent a photochromic reaction in response to said predetermined light.

2. An optical recording medium comprising:
   a substrate:
   an information recording region arranged on said substrate and capable of bearing information being readable with predetermined light; and
   a tracking region arranged on said substrate, having optical characteristics different from those of said information recording region and having substantially no difference in level with respect to the surface of said information recording region, wherein said tracking region is recorded in a state preventing change by said predetermined light, wherein
   a reflectance or a transmittance of said tracking region with respect to said predetermined light is different from a reflectance or a transmittance of said information recording region with respect to said predetermined light, and
   said information recording region is a region including a photochromic material and an acceptor material, and said tracking region is a pattern region formed by a complex formed between the photochromic material and the acceptor material in a portion of said information recording region, and thereby formed by recording in a fixed fashion to prevent a photochromic reaction in response to said predetermined light.

* * * * *